(12) United States Patent
Uemura (10) Patent No.: US 8,689,630 B2
(45) Date of Patent: Apr. 8, 2014

(54) INERTIAL FORCE SENSOR AND DETECTING ELEMENT USED FOR SAME

(75) Inventor: Takeshi Uemura, Osaka (JP)

(73) Assignee: Panasonic Corporation, Osaka (JP)

( * ) Notice: Subject to any disclaimer, the term of this patent is extended or adjusted under 35 U.S.C. 154(b) by 373 days.

(21) Appl. No.: 13/143,100

(22) PCT Filed: Feb. 10, 2010

(86) PCT No.: PCT/JP2010/000815
§ 371 (c)(1),
(2), (4) Date: Jul. 1, 2011

(87) PCT Pub. No.: WO2010/092806
PCT Pub. Date: Aug. 19, 2010

(65) Prior Publication Data
US 2011/0265567 A1 Nov. 3, 2011

(30) Foreign Application Priority Data
Feb. 13, 2009 (JP) ................................. 2009-030787

(51) Int. Cl.
*G01C 19/56* (2012.01)

(52) U.S. Cl.
USPC ..................................... 73/504.12; 73/504.16

(58) Field of Classification Search
USPC ......................................... 73/504.12, 504.16
See application file for complete search history.

(56) References Cited

U.S. PATENT DOCUMENTS

| | | | |
|---|---|---|---|
| 4,674,331 A | 6/1987 | Watson | |
| 5,691,471 A | 11/1997 | Okazaki et al. | |
| 5,796,000 A | 8/1998 | Fujiu et al. | |
| 6,666,091 B2 | 12/2003 | Hatanaka et al. | |
| 7,043,986 B2 | 5/2006 | Kikuchi et al. | |
| 8,117,913 B2 * | 2/2012 | Terada | ........................ 73/504.12 |
| 2009/0320594 A1 | 12/2009 | Ohuchi et al. | |

FOREIGN PATENT DOCUMENTS

| | | |
|---|---|---|
| JP | 62-106314 | 5/1987 |
| JP | 6-174739 | 6/1994 |
| JP | 06-174739 | 6/1994 |
| JP | 7-190782 | 7/1995 |
| JP | 8-145683 | 6/1996 |
| JP | 9-287956 | 11/1997 |
| JP | 10-185582 | 7/1998 |
| JP | 2001-208546 | 8/2001 |
| JP | 2003-121156 | 4/2003 |
| JP | 2004-245605 | 9/2004 |
| JP | 2005-221361 | 8/2005 |
| JP | 2006-226770 | 8/2006 |
| JP | 2007-232710 | 9/2007 |
| JP | 2008-122263 | 5/2008 |
| JP | 2008-203070 | 9/2008 |
| WO | 2008-023653 | 2/2008 |
| WO | 2008-102537 | 8/2008 |

OTHER PUBLICATIONS

International Search Report of PCT Application No. PCT/JP2010/000815, dated May 18, 2010.

* cited by examiner

*Primary Examiner* — John Chapman, Jr.
(74) *Attorney, Agent, or Firm* — Panasonic Patent Center (57) ABSTRACT

A detecting element for an inertial force sensor includes a mass section, an excitation section, and a detecting section. The excitation section excites the mass section along a third direction among a first direction, a second direction, and the third direction that are perpendicular to each other. The detecting section outputs a signal corresponding to displacement of the mass section along at least one of the first direction and the second direction. Resonance frequencies of the first direction and the second direction are set greater than a resonance frequency of the third direction.

5 Claims, 10 Drawing Sheets

INERTIAL FORCE SENSOR AND DETECTING ELEMENT USED FOR SAME

TECHNICAL FIELD

The present invention relates to inertial force sensors and detecting elements used in the inertial force sensor. Inertial force sensors are employed in a range of electronic devices, including attitude control of mobile objects such as airplanes, vehicles, robots, and vessels; and position detection of game machines and navigation systems.

BACKGROUND ART

An angular velocity sensor, which is one of conventional inertial force sensors, is described below. A conventional angular velocity sensor includes a detecting element that typically has a tuning-fork shape, H-shape, T shape, or disk shape. An angular velocity is detected by vibrating this detecting element and electrically detecting distortion (strain) of the detecting element caused by occurrence of Coriolis force. For example, if a vehicle is disposed on an X-Y plane defined of X-axis and Y-axis assuming that the X-axis, the Y-axis, and Z-axis are substantially perpendicular to each other, the angular velocity sensor in the navigation system detects the angular velocity around the Z-axis of the vehicle.

Figure 11:
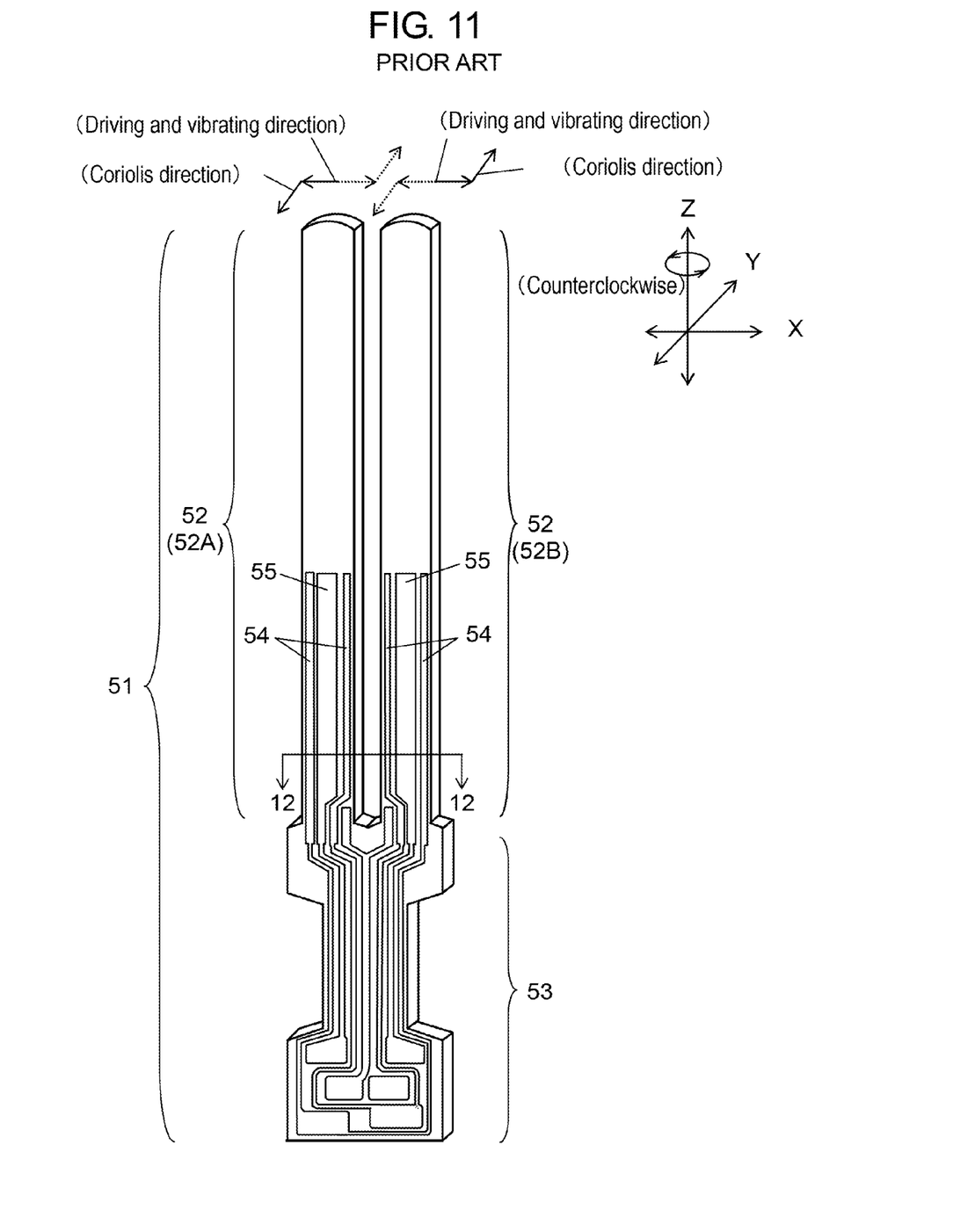
FIG. 11 is a perspective view of a detecting element in a conventional angular velocity sensor.
Figure 12:
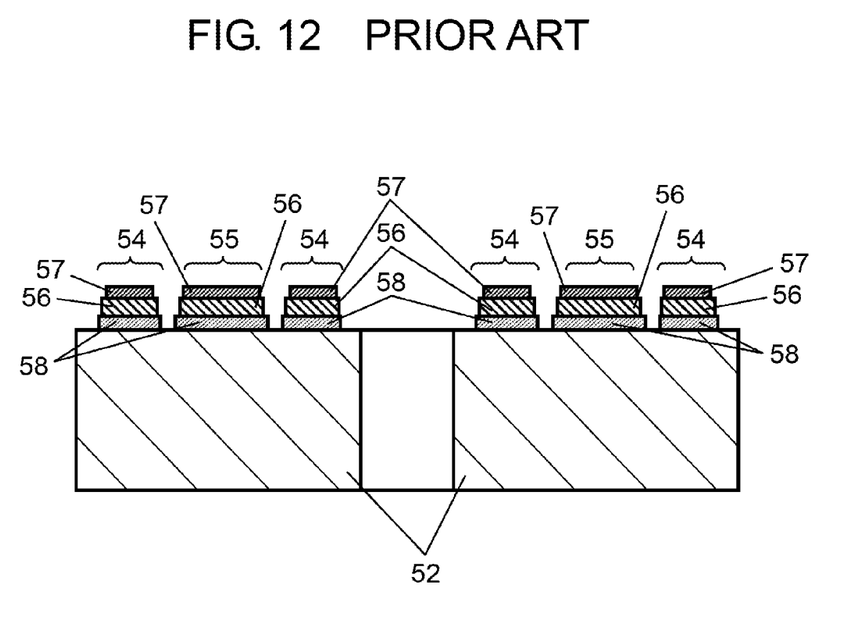
FIG. 12 is a sectional view taken along Line 12-12 in FIG. 11.

FIG. 11 is a perspective view of a detecting element of a conventional angular velocity sensor. FIG. 12 is a sectional view taken along line 12-12 in FIG. 11. Detecting element 51 has a tuning-fork shape, and includes two arms 52 (52A and 52B) and base 53 connecting arms 52.

Drive electrode 54 for driving and vibrating arm 52 and sensor electrode 55 for sensing distortion of arm 52 caused by angular velocity are disposed on each arm 52. For example, each of drive electrode 54 and sensor electrode 55 is formed of upper electrode 57 and lower electrode 58 with piezoelectric body 56 in between.

Detecting element 51 is disposed, for example, standing along the Z-axis direction with respect to the X-Y plane. In this state, arms 52 are driven and vibrated along the X-axis direction to detect distortion caused by the angular velocity around the Z-axis by arms 52. The angular velocity around the Z-axis is detected by this detection. A driving and vibration face (X-Z plane) of each arm 52 and a distortion face (Y-Z plane) of each arm 52 are perpendicular to each other, and distortion directions are opposite between arm 52A and arm 52B. For example, if arm 52A is distorted in a positive direction of Y-axis, arm 52B is distorted in a negative direction of Y-axis. This type of angular-velocity sensor is disclosed in PTL 1.

In general, sensitivity of sensor electrode 55 can be improved by reducing a frequency difference (mistuned frequency) between a frequency for excitation and a frequency for sensing on detecting the angular velocity. This also results in improving the detection sensitivity of angular velocity. In addition, the frequency for excitation and the frequency for sensing are also designed to be resonance frequencies of detecting element 51, respectively. However, a sufficient gain may not be obtained if detecting element 51 is designed based only on these indexes.

CITATION LIST

Patent Literature

[PTL 1] Japanese Patent Unexamined Publication No. 2001-208546

SUMMARY OF THE INVENTION

The present invention is a detecting element in which gain for detecting the inertial force in a detecting axis is increased to improve a sensing characteristic, and an inertial force sensor using this detecting element. The detecting element for the inertial force sensor of the present invention includes a mass section, an excitation section, and a detecting section. Among a first direction, a second direction, and the third direction that are perpendicular to each other, the excitation section excites the mass section along the third direction. The detecting section outputs a signal corresponding to displacement of the mass section along at least one of the first direction and the second direction. A resonance frequency of the first direction and the second direction are set greater than the resonance frequency of the third direction.

With this configuration, a sensing efficiency of detection sensitivity can be improved on detecting inertial force around the first direction and/or second direction. In addition, variations in the detection sensitivity can be suppressed. Accordingly, the sensitivity characteristic can be improved.

DETAILED DESCRIPTION OF PREFERRED EMBODIMENT

Figure 1:
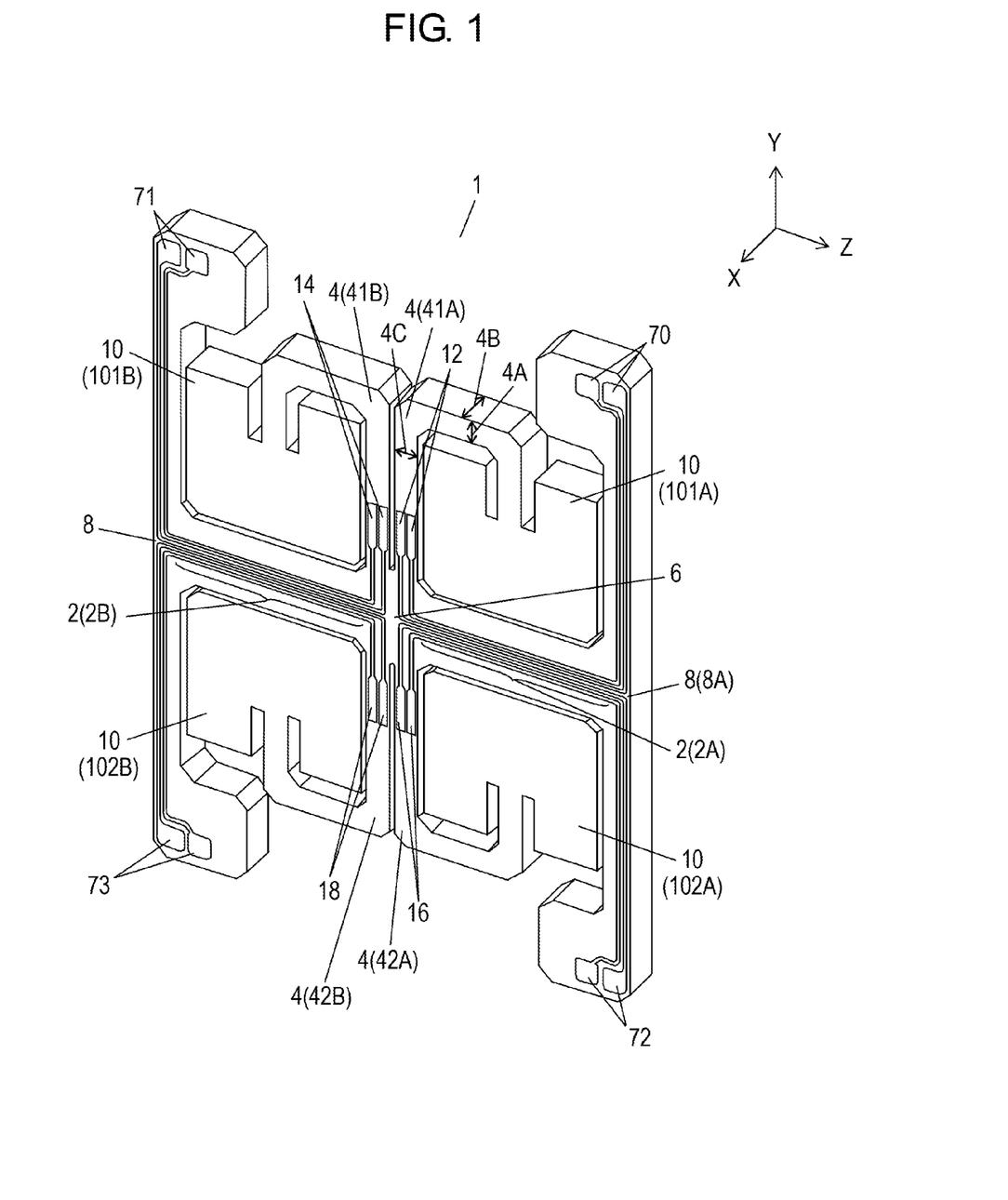
FIG. 1 is a perspective view of a detecting element in an angular velocity sensor that is one of inertial force sensors in accordance with an exemplary embodiment of the present invention.
Figure 2A:
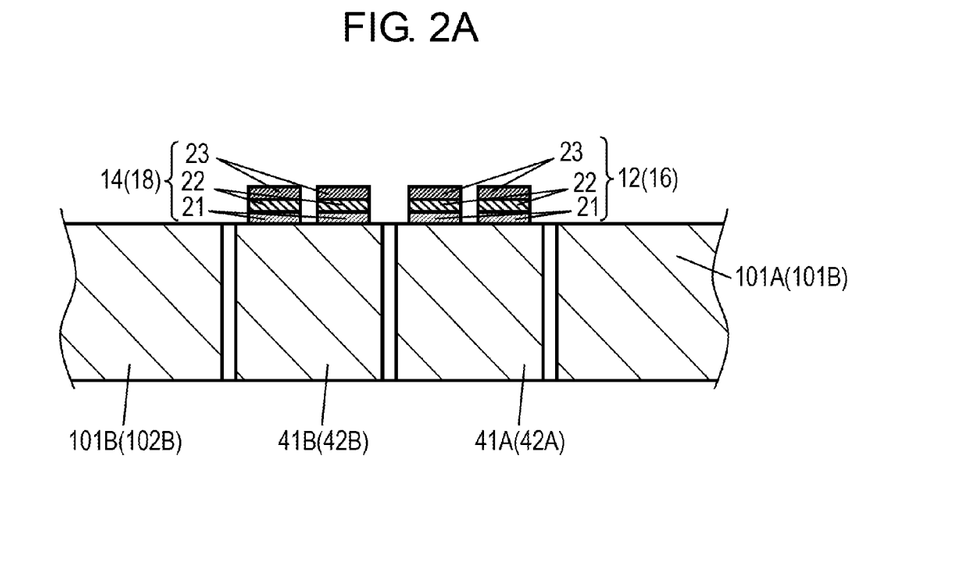
FIG. 2A is a fragmentary sectional view of the detecting element in FIG. 1.
Figure 3:
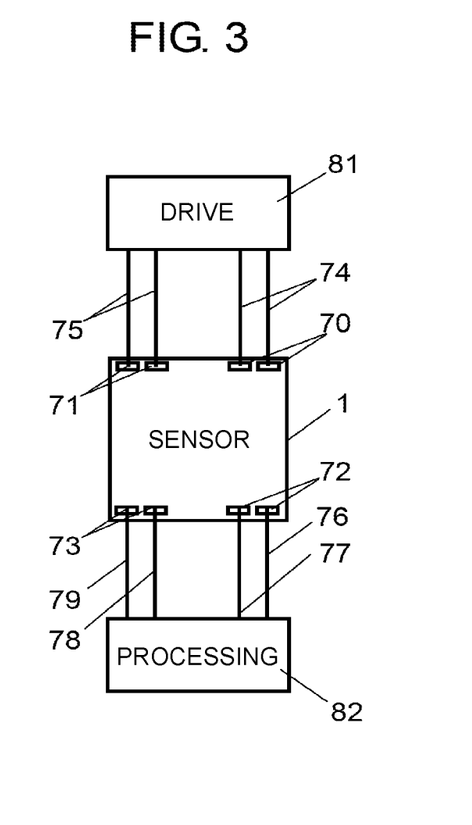
FIG. 3 is a block diagram of the inertial force sensor in accordance with the exemplary embodiment of the present invention.
Figure 4:
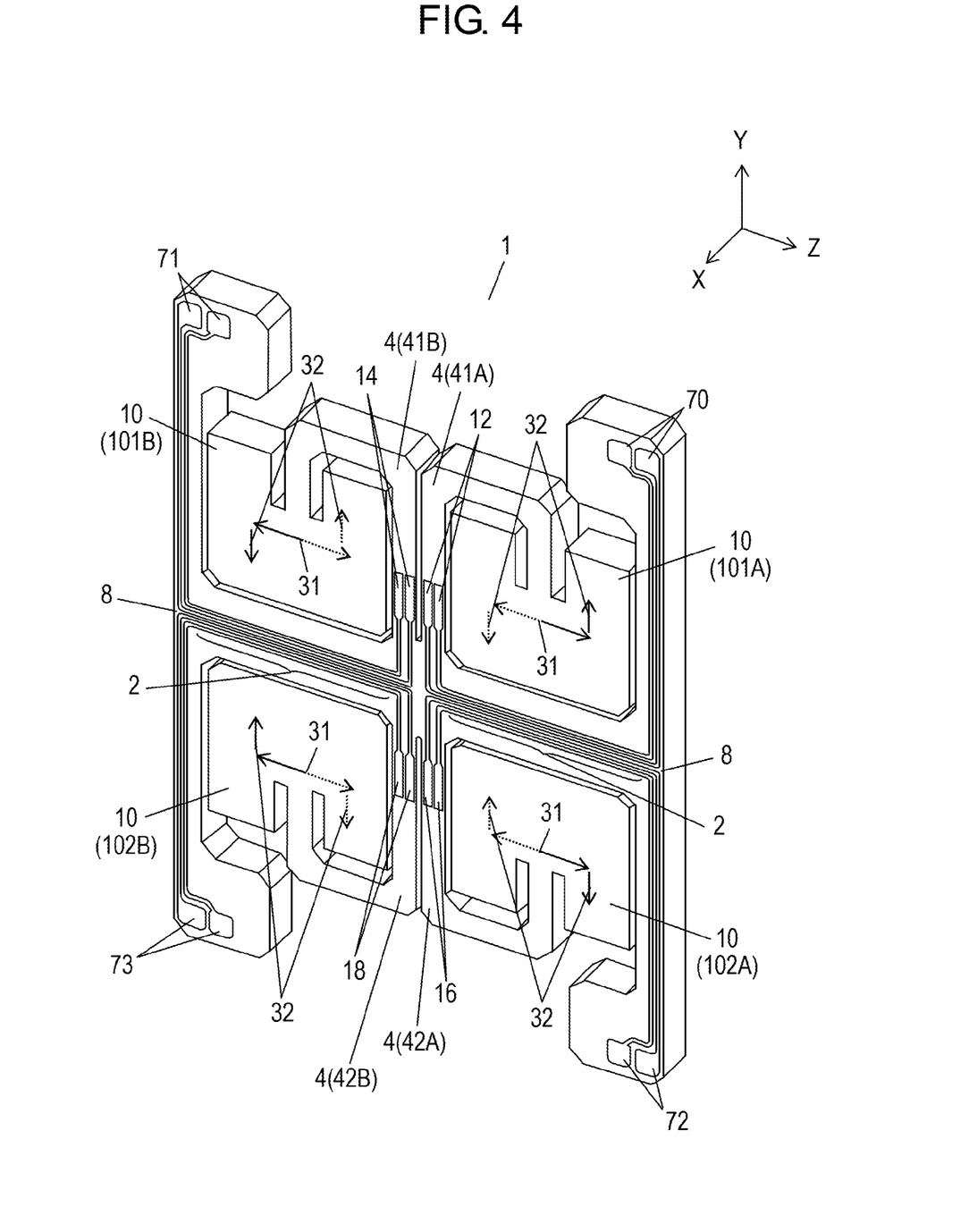
FIG. 4 illustrates an operating state of the detecting element in FIG. 1.

FIG. 1 is a perspective view of a detecting element in an angular velocity sensor that is one of inertial force sensors in an exemplary embodiment of the present invention. FIG. 2A is a fragmentary sectional view of the detecting element shown in FIG. 1. FIG. 3 is a block diagram of the angular velocity sensor in the exemplary embodiment of the present invention. FIG. 4 illustrates an operating state of the detecting element shown in FIG. 1.

As shown in FIG. 3, this angular velocity sensor includes detecting element 1, drive section 81, and processing circuit 82. As shown in FIG. 1, detecting element 1 includes two first arms 2 (2A and 2B) extending horizontally (Z-axis direction) from support 6, two second arms 4 extending vertically (Y-axis direction) from the support 6 side of first arms 2. Second arm 4 extending from first arm 2A is configured with upper second arm 41A and lower second arm 42A. Second arm 4 extending from first arm 2B is configured with upper second arm 41B and lower second arm 42B. Accordingly, detecting element 1 includes two orthogonal arms each formed by connecting first arm 2 and second arm 4 perpendicularly. In these orthogonal arms, first ends of first arms 2 are connected to support 6.

Second ends of first arms 2 are connected to mounting arms 8 (8A, 8B) for mounting onto a board. Two first arms 2 and support 6 are disposed in the same straight line, and mounting arms 8 are disposed perpendicular to first arms 2. In other words, first arms 2A and 2B and support 6 are disposed in the same straight line. Mounting arms 8A and 8B are disposed perpendicular to first arms 2A and 2B.

Second arms 4 are disposed extremely close to each other, and they are bent in a U shape toward mounting arms 8. Mass section 10 is formed at their tips. In other words, second arm 41A and second arm 41B are disposed extremely close to each other, and second arm 42A and second arm 42B are disposed extremely close to each other. Second arms 41A and 42A are bent in a U shape so that they come close to mounting arm 8A. Second arms 41B and 42B are bent in a U shape so that they come close to mounting arm 8B. Still more, mass sections 101A, 102A, 101B, and 102B are formed at tips of second arms 41A, 42A, 41B, and 42B, respectively.

Detecting element 1 includes mass section 10, an excitation section, and a detecting section. The excitation section excites mass section 10 along the Z-axis direction among the X-axis direction, Y-axis direction, and Z-axis direction that are perpendicular to each other. The detecting section detects displacement of mass section 10 along at least one of the X-axis direction and the Y-axis direction. On detecting the angular velocity, processing circuit 82 detects the angular velocity around X-axis in accordance with an output from the detecting section based on displacement of mass section 10 along the Y-axis direction when the excitation direction is along the Z-axis direction. Processing circuit 82 also detects the angular velocity around Y-axis in accordance with an output from the detecting section based on displacement of mass section 10 along the X-axis direction.

More specifically, the excitation section is formed by disposing first excitation electrode 12 and second excitation electrode 14 to the support 6 side of second arms 41A and 41B, which are second arms 4 disposed on the positive side of Y-axis, respectively. On the other hand, the detecting section is formed by disposing first sensor electrode 16 and second sensor electrode 18 to the support 6 side of second arms 42A and 42B, which are second arms 4 disposed on the negative side of Y-axis, respectively. First sensor electrode 16 detects distortion (strain) of second arm 42A, and second sensor electrode 18 detects distortion of second arm 42B. The excitation section and detecting section are formed on a Y-Z plane of detecting element 1.

Detecting element 1 also includes electrode pads 70 to 73. Electrode pad 70 is electrically connected to first excitation electrode 12, and electrode pad 71 is electrically connected to second excitation electrode 14. Electrode pad 72 is electrically connected to first sensor electrode 16, and electrode pad 73 is electrically connected to second sensor electrode 18.

As shown in FIG. 3, drive section 81 is electrically connected to electrode pads 70 and 71 via wirings 74 and 75. Processing circuit 82 is electrically connected to electrode pads 72 and 73 via wirings 76 to 79. Accordingly, drive section 81 is electrically connected to first and second excitation electrodes 12 and 14, and processing circuit 82 is electrically connected to first and second sensor electrodes 16 and 18.

Figure 2B:
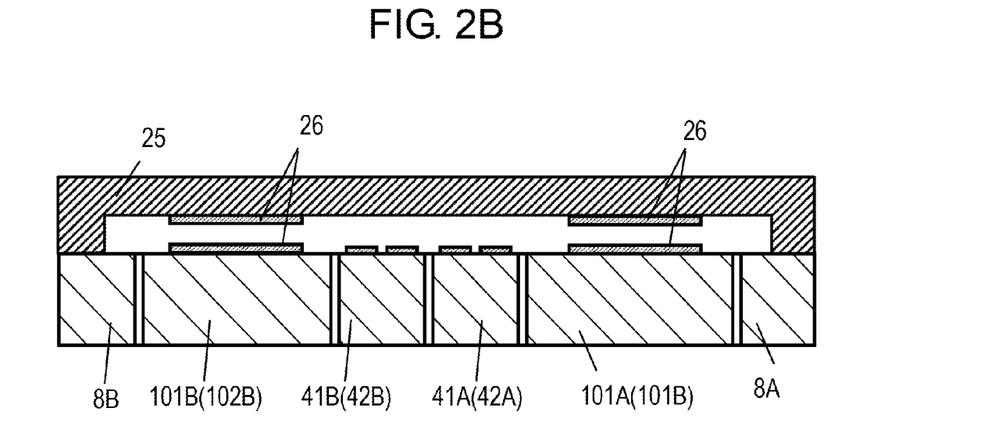
FIG. 2B is another sectional view of the detecting element in FIG. 1.

As shown in FIG. 2A, first and second excitation electrodes 12 and 14 and first and second sensor electrodes 16 and 18 are formed of electrodes 21 and 23 with piezoelectric body 22 in between. Alternatively, as shown in the sectional view in FIG. 2B, cover 25 for covering detecting element 1 may be provided, and opposing electrodes 26, which is capacitively-coupled to cover 25 and mass section 101B, may be disposed. Drive section 81 applies AC voltage between electrodes 21 and 23 to change the piezoelectric state of piezoelectric body 22. This makes first and second excitation electrodes 12 and 14 excite detecting element 1. The piezoelectric state of piezoelectric body 22 in first and second sensor electrodes 16 and 18 is changed by the angular velocity applied to detecting element 1. Each of first and second sensor electrodes 16 and 18 output a current signal generated by this change. Or, a change in capacitance generated between opposing electrodes 26, caused by acceleration applied to detecting element 1, may be used as a signal. A configuration using opposing electrodes 26 is disclosed, for example, in the Japanese Patent Unexamined Publication No. 2008-203070.

Next, the operation of the angular velocity sensor in the exemplary embodiment is described with reference to FIGS. 3 and 4. In mutually perpendicular X-axis, Y-axis, and Z-axis, first arm 2 of detecting element 1 is disposed, for example, along the Z-axis direction, and second arm 4 is disposed along the Y-axis direction. In this case, when second arms 41A and 41B are excited by applying AC voltage to first and second excitation electrodes 12 and 14 from drive section 81, mass sections 101A and 101B are also synchronously excited. Vibration of mass sections 101A and 101B is then transferred to mass sections 102A and 102B, and mass sections 102A and 102B are also excited. Resultantly, second arms 42A and 42B are also excited.

Excitation direction 31 of mass section 10 is along the Z-axis direction, and four mass sections 10 are synchronously excited toward approaching and distancing directions to each other. More specifically, mass section 101A and mass section 101B are excited toward approaching and distancing directions to each other, and mass section 102A and mass section 102B are excited toward approaching and distancing directions to each other. Mass section 101A and mass sections 102A are simultaneously excited toward the same directions.

In this state, if an angular velocity is generated around the X-axis, for example, Coriolis force 32 is generated, synchronizing with excitation of mass section 10, along the Y-axis direction that is perpendicular to the excitation direction relative to mass section 10. This causes distortion of second arms 41B and 42B along the Y-axis direction. Current signals corresponding to this distortion are generated in first and second sensor electrodes 16 and 18. Processing circuit 82 detects the angular velocity around the X-axis based on these outputs.

If the angular velocity is generated around the Y-axis, the Coriolis force is generated, synchronizing with excitation of mass section 10, along the X-axis direction that is perpendicular to the excitation direction relative to mass section 10. This causes distortion of second arms 41B and 42B along the X-axis direction. Current signals corresponding to this distortion are generated in first and second sensor electrodes 16 and 18. Processing circuit 82 detects the angular velocity around the Y-axis based on theses outputs.

A combination of signs (positive and negative) differ in signals generated at first and second sensor electrodes 16 and 18 between cases when the angular velocity is generated around the X-axis and the angular velocity is generated around the Y-axis. Therefore, processing circuit 82 can distinguish whether the angular velocity is generated around the X-axis or Y-axis. Depending on the purpose of use, angular velocity only around the X-axis or Y-axis may be detected.

In general, it is advantageous to reduce a frequency difference (mistuned frequency) between the excitation frequency and sensing frequency on detecting the angular velocity because the sensitivity of first and second sensor electrodes 16 and 18 can be improved. This also results in improving the detection sensitivity.

Still more, the excitation frequency and sensitive frequency are designed to be equivalent to resonance frequencies of detecting element 1, respectively. More specifically, in FIG. 4, the excitation frequency is designed to be the resonance frequency of the Z-axis direction (Fzd) of the excitation direction, and the sensing frequency is designed to be the resonance frequency of the X-axis direction (Fsx), which is a direction generating distortion, and resonance frequency (Fsy) of the Y-axis direction.

Figure 5:
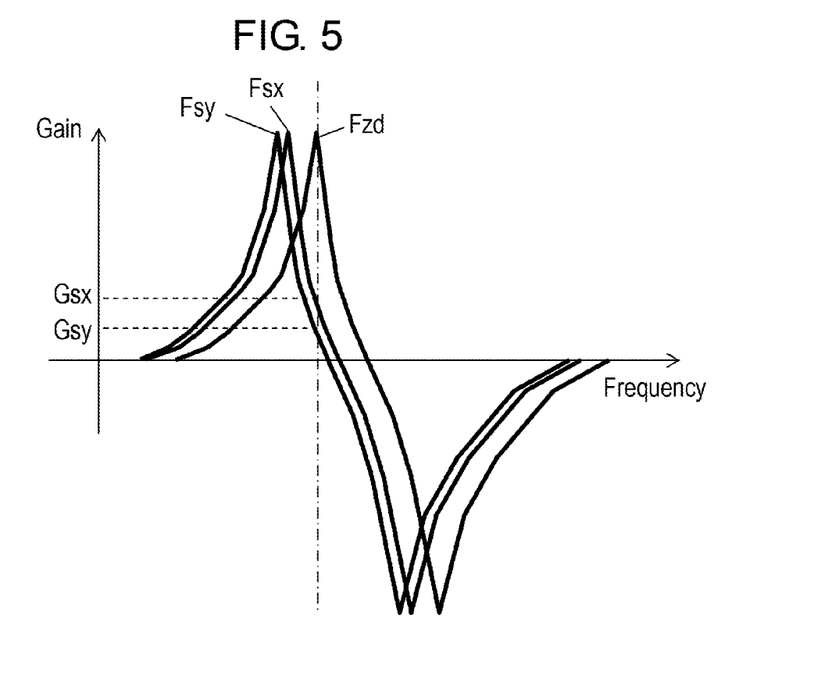
FIG. 5 illustrates a resonance admittance characteristic wave of a detecting element in an angular velocity sensor.

For example, FIG. 5 shows resonance admittance characteristic waves of the X-, Y-, and Z-axis directions of detecting element 1 in the above case. The relationship among Fzd, Fsx, and Fsy becomes Fzd>Fsx>Fsy.

If distortion is generated along the X-axis direction, sensitivity output (gain) of first and second sensor electrodes 16 and 18 is Gsx. If distortion is generated in the Y-axis direction, the gain is Gsy. Here, Gsx and Gsy mean gains of resonance admittance characteristic waves of the X-axis and Y-axis directions of resonance frequency (Fzd). The resonance admittance characteristic waves of the X-axis and Y-axis directions are, as shown in FIG. 5, steep on the side of antiresonance frequency (high-frequency band side) and moderate on the side away from antiresonance frequency (low-frequency band side) centering on Fsx and Fsy, which are resonance frequencies. In other words, in the case of Fzd>Fsx>Fsy, the waveform is steep even if mistuned frequencies of Fzd, Fsx, and Fsy are reduced. It is thus is difficult to achieve sufficient gain. Still more, in the case Fsx and Fsy are deviated to the low-frequency band side, the gain is significantly reduced.

Figure 6:
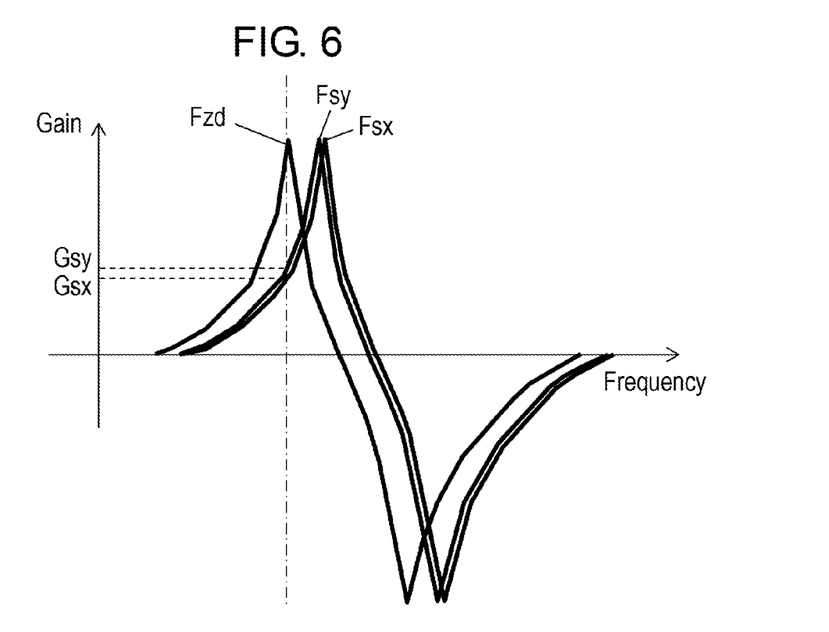
FIG. 6 illustrates a resonance admittance characteristic wave of the detecting element in the exemplary embodiment.

Accordingly, as shown in FIG. 6, the exemplary embodiment achieves Fzd<Fsy<Fsx. In the case of Fzd<Fsy<Fsx, resonance admittance characteristic waves in the X-axis and Y-axis directions become moderate. A sufficient gain can thus be easily achieved by reducing mistuned frequencies between Fzd and Fsx, and Fzd and Fsy. Still more, in the case Fsx and Fsy are deviated to the low frequency side, the gain does not significantly reduce. The relationship among Fzd, Fsx, and Fsy may also be Fzd<Fsx<Fsy, as long as Fsx and Fsy are greater than Fzd.

The relationship of amplitudes of Fsx, Fsy, and Fzd can be set typically by changing the aspect ratio of a cross section of second arms 4. As shown in FIG. 1, second arm 4 has thickness 4B in the X-axis direction, width 4C at a portion extending in the Y-axis direction from support 6, and width 4A at a portion bent toward mounting arm 8 and extending in the Z-axis direction. Here, values of width 4A, thickness 4B, and width 4C are defined as a, b, and c. Fsx becomes greater if b/c is increased, and becomes less if b/c is decreased. Fsy becomes greater if a/c is increased, and becomes less if a/c is decreased. Fzd becomes greater if c/a is increased and also c/b is increased, and becomes less if c/a is decreased and also c/b is decreased. Accordingly, Fsx and Fsy can be set greater than Fzd by appropriately setting a, b, and c based on these relations.

Designing detecting element 1 to achieve the above relationship among resonance frequencies allows the sensing efficiency of detection sensitivity to be improved, variations in detection sensitivity to be suppressed, and sensitivity characteristic to be improved.

In particular, if Fsx and Fsy are set equivalent, the processing circuit can be shared or unified also for processing or amplifying sensitivity outputs of Gsx and Gsy. This eliminates the need of providing separate processing circuits, and thus influence of error (variation) in each processing circuit can be eliminated. Accordingly, detection sensitivity can be improved by suppressing detection error (detection variation).

Figure 7:
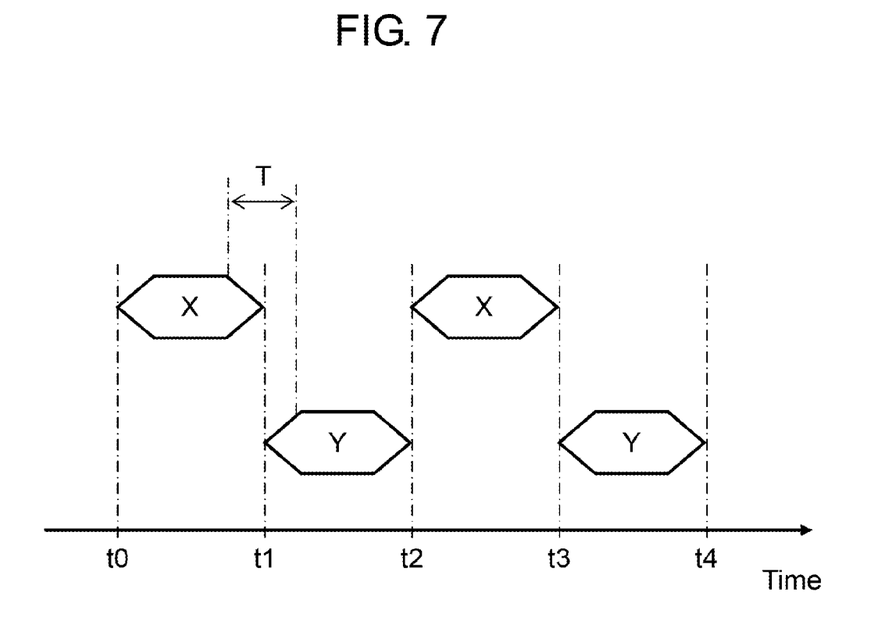
FIG. 7 is a chart illustrating an example of calculation of an angular velocity in a processing circuit of the angular velocity sensor in the exemplary embodiment.

Next is described processing in the sensor when processing circuits for calculating the angular velocity around the X-axis and the angular velocity around the Y-axis are shared, as described above, with reference to FIG. 7. FIG. 7 is a chart for illustrating an example of calculation of angular velocity in the processing circuit of this angular velocity sensor.

As shown in FIG. 3, processing circuit 82 receives sensed signals output from first sensor electrode 16 and second sensor electrode 18 via wirings 76 to 79, and calculates angular velocity. At this point, if frequencies for Fsx and Fsy are set equivalent, processing circuit 82 can calculate the angular velocity around X-axis and the angular velocity around Y-axis by time division.

As shown in FIG. 7, processing circuit 82 calculates the angular velocity around X-axis between time t0 and time t1, and between time t2 and time t3. Then, processing circuit 82 calculates the angular velocity around Y-axis between time t1 and time t2, and between time t3 and time t4. In other words, processing circuit 82 detects displacement of mass sections 102A and 102B along the first direction during the first period. Then, processing circuit 82 detects displacement of mass sections 102A and 102B along the second direction during the second period that is different from the first period. By applying time division to processing in this way, single processing circuit 82 can be used for calculating both angular velocity around X-axis and angular velocity around Y-axis.

More specifically, sum (sum A) of signal (S77) input from wiring 77 and signal (S79) input from wiring 79 is calculated between t0 and t1 and between t2 and t3. On the other hand, sum (sum B) of signal (S76) input from wiring 76 and signal (S78) input from wiring 78 is calculated. By calculating a difference between sum A and sum B, angular velocity Yx around X-axis can be calculated. In other words, angular velocity Yx around X-axis can be calculated using Formula 1.

$$Yx=(S77+S79)-(S76+S78) \qquad \text{(Formula 1)}$$

Between t1 and t2 and between t3 and t4, sum (sum C) of signal (S76) input from wiring 76 and signal (S77) input from wiring 77 is calculated. On the other hand, sum (sum D) of signal (S78) input from wiring 78 and signal (S79) input from wiring 79 is calculated. By calculating a difference between sum C and sum D, angular velocity Yy around Y-axis can be calculated. In other words, angular velocity Yy around Y-axis can be calculated using Formula 2.

$$Yy=(S76+S77)-(S78+S79) \qquad \text{(Formula 2)}$$

In order to shift the state of processing circuit from that for calculating the angular velocity around X-axis to that for calculating the angular velocity around Y-axis, switchover time T is needed. If Fsx and Fsy are remarkably different, constants for gain and filter of processing circuit 82 need to be switched during switchover time T. In addition, configuration of processing circuit 82 needs to be switched from that for calculation using Formula 1 to that for calculation using Formula 2. Accordingly, a switchover time needs to be set long to some extent.

However, if Fsx and Fsy are set equivalent in detecting element 1, there is no need to switch over constants for gain and filter in processing circuit 82. Accordingly, switchover time T in processing circuit 82 can be reduced.

In general, logic IC is used for processing circuit 82. However, the exemplary embodiment is not limited to logic IC. More specifically, all functions or some functions of processing circuit 82 may be achieved using software typically using a digital signal processor or microcomputer.

In addition, as long as a difference between Fsx and Fsy is within a predetermined range, Fsx and Fsy do not have to be exactly the same for sharing or unifying the processing circuit. For example, an allowance for gain variations in the processing circuit is generally 5%. Therefore, a difference in frequencies may be set to a range that a difference in sensitivity outputs (gain) becomes within 5%. This reduces an influence of difference between Fsx and Fsy even if a processing circuit for calculating the angular velocity around X-axis and a processing circuit for calculating the angular velocity around Y-axis are shared or unified. In addition, a difference between Fsx and Fsy may be set within a range of variations of resonance frequency caused by manufacturing variations (e.g., 1% max.). This enables suppression of a calculation error in angular velocity around X-axis and a calculation error in angular velocity around Y-axis within manufacturing variations even if the processing circuit for calculating the angular velocity around X-axis and the processing circuit for calculating the angular velocity around Y-axis are shared or unified.

As described above, the excitation direction of mass section 10 in detecting element 1 is set along the Z-axis direction in mutually perpendicular X-axis, Y-axis, and Z-axis. Here, the inertial force around X-axis is detected based on displacement of mass section 10 along the Y-axis direction, and the inertial force around Y-axis is detected based on displacement of mass section 10 along the X-axis direction. A single detecting element 1 can thus detect the inertial force in multiple detecting axes. Accordingly, multiple detecting elements 1 or multiple inertial force sensors are not needed to be mounted for detecting inertial force in multiple detecting axes. A mounting area can thus be reduced, and in turn, a range of electronic devices that employ the inertial force sensor can be downsized.

In detecting element 1, the resonance frequencies in the X-axis direction and Y-axis direction are set greater than the resonance frequency in the Z-axis direction. This improves the efficiency of detection sensitivity at detecting the inertial force around X-axis and/or Y-axis. Variations in detection sensitivity can also be suppressed. Accordingly, sensitivity characteristic can be improved.

Figure 8:
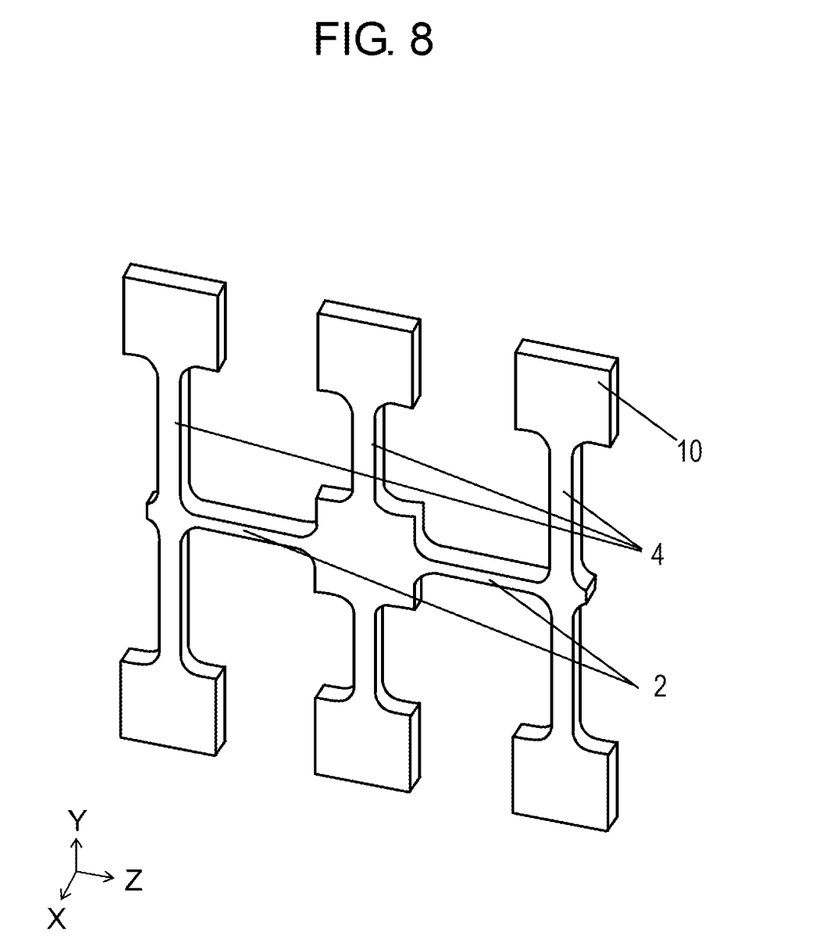
FIG. 8 is a perspective view of another detecting element in the inertial force sensor in the exemplary embodiment.

The same effect is achievable with shapes of detecting element 1 other than that in the exemplary embodiment. For example, as shown in FIG. 8, a detecting element may be configured with three or more orthogonal arms each in which first arm 2 and second arm 4 are connected in the orthogonal direction. In each of these orthogonal arms, first arms 2 are mutually connected, and mass section 10 is formed at a tip of each of second arms 4. A prior art related to this shape is disclosed in the Japanese Patent Unexamined Publication No. 2004-245605 and the Japanese Patent Unexamined Publication No. 2005-221361. Detecting element 1 disclosed in these publications use three or more orthogonal arms.

Figure 9:
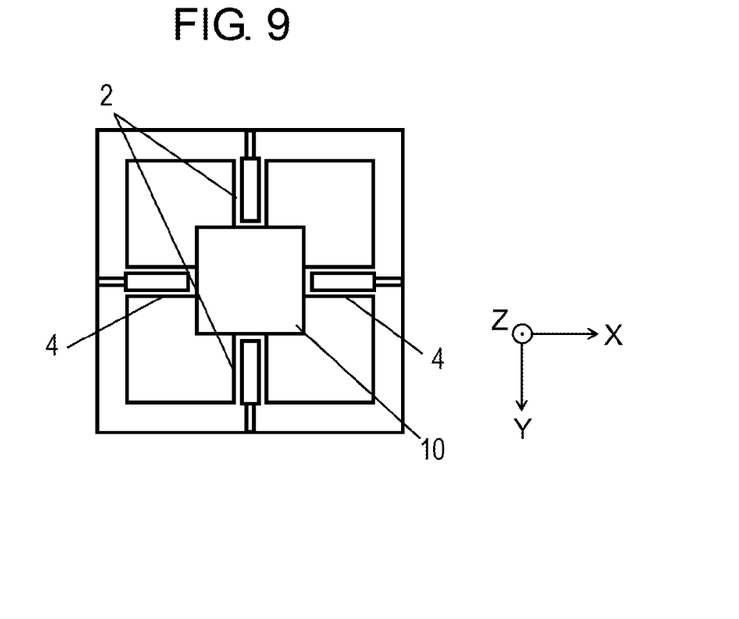
FIG. 9 is a top view of still another detecting element in the inertial force sensor in the exemplary embodiment.

Alternatively, as shown in FIG. 9, the detecting element may be configured with a cross arm formed by connecting first arms 2 and second arms 4 in a crossed manner. Mass section 10 is formed at the center of the cross arm. A prior art related to this shape is disclosed in the Japanese Patent Unexamined Publication No. H6-174739 and the Japanese Patent Unexamined Publication No. H7-190782. In this configuration, first arms 2 and second arms 4 are formed as beams.

Figure 10:
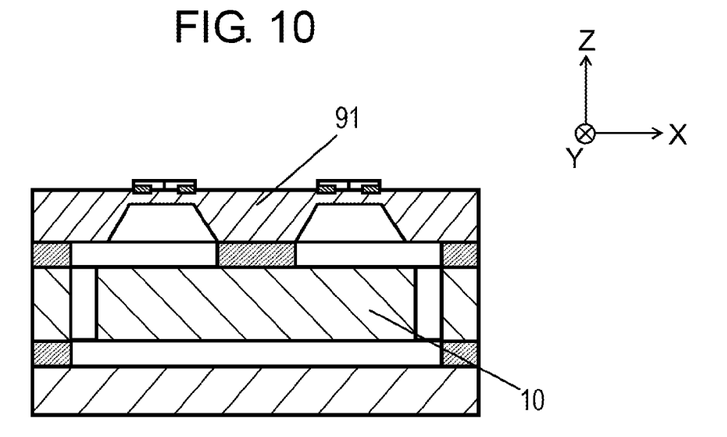
FIG. 10 is a sectional view of yet another detecting element in the inertial force sensor in the exemplary embodiment.

Alternatively, as shown in FIG. 10, the detecting element may be configured by forming flat base 91, and mass section 10 is formed at the center of base 91. A prior art related to this shape is disclosed in the Japanese Patent Unexamined Publication No. H8-145683 and the Japanese Patent Unexamined Publication No. H10-185582. In this configuration, a diaphragm (flat base 91) is formed instead of first arm 2 and second arm 4.

In any of the above configurations, the same effect as detecting element 1 in FIG. 1 can be achieved as long as resonance frequencies in the X-axis direction and Y-axis direction are set greater than resonance frequency in the Z-axis direction.

The exemplary embodiment refers to the case of setting the excitation direction of mass section 10 along the Z-axis direction. However, the detecting element is not limited to this arrangement. For example, if the excitation direction of mass section 10 is set along the Y-axis direction, processing circuit 82 calculates angular velocities around Z-axis and X-axis. In other words, the X-axis direction, Y-axis direction, and Z-axis direction are the first direction, second direction, and third direction that are perpendicular to each other. The exemplary embodiment refers to detection of angular velocity. However, the detecting element may be used for detecting acceleration.

The above description centers on the angular velocity sensor as one of inertial force sensors. However, the present invention is also applicable, for example, to acceleration sensors.

INDUSTRIAL APPLICABILITY

An inertial force sensor of the present invention can detect the inertial force along multiple detecting axes, and is thus applicable to a range of electronic devices.

REFERENCE MARKS IN THE DRAWINGS

1 Detecting element
2, 2A, 2B First arm
4, 41A, 41B, 42A, 42B Second arm
4A, 4C Width
4B Thickness
6 Support
8, 8A, 8B Mounting arm
10, 101A, 101B, 102A, 102B Mass section
12 First excitation electrode
14 Second excitation electrode
16 First sensor electrode
18 Second sensor electrode
21, 23 Electrode
22 Piezoelectric body
25 Cover
26 Opposing electrode
31 Excitation direction
32 Coriolis force
70, 71, 72, 73 Electrode pad
74, 75, 76, 77, 78, 79 Wiring

81 Drive section
82 Processing circuit
91 Base

The invention claimed is:

1. An inertial force sensor comprising:
   a mass section;
   a plurality of orthogonal arms formed by connecting a first arm and a second arm in an orthogonal direction;
   an excitation section configured to excite the mass section at an excitation frequency;
   a detecting section configured to output a signal corresponding to displacement of the mass section along at least one of a first direction and a second direction inclined to the first direction,
   wherein the first arms of the plurality of orthogonal arms are mutually connected, and the mass section is formed at a tip of the each second arm,
   resonance frequencies of the first direction and the second direction are set greater than the excitation frequency,
   a drive section is connected to the excitation section, and configured to input a drive signal to the excitation section, and
   a processing circuit is connected to the detecting section, and configured to detect displacement of the mass section along the first direction and the second direction based on the signal output from the detecting section, wherein,
   the processing circuit is configured to output a first signal corresponding to the displacement of the mass section along the first direction during a first period, and output a second signal corresponding to the displacement of the mass section along the second direction during a second period different from the first period.

2. The detecting element for inertial force sensor of claim 1, wherein the first direction and the second direction are perpendicular to each other.

3. The detecting element for inertial force sensor of claim 1,
   wherein the displacement of the mass section along the first direction is caused by Coriolis force generated by an angular velocity around the second direction, and the displacement of the mass section along the second direction is by Coriolis force generated by an angular velocity around the first direction.

4. The detecting element for inertial force sensor of claim 1,
   wherein the excitation section is configured to excite the mass section along a third direction, the third direction being one of a first direction, a second direction and the third direction that are perpendicular to each other.

5. The detecting element for inertial force sensor of claim 1,
   wherein the resonance frequency of the first direction and the resonance frequency of the second direction are substantially equivalent.

* * * * *